INVENTOR.
Roland I. Kuffler
BY
Evans & McCoy
ATTORNEYS

Dec. 6, 1949         R. I. KUFFLER         2,490,445
MECHANISM FOR COMPACTING TIRE CARCASSES
ON TIRE BUILDING MACHINES
Filed Aug. 9, 1947                           5 Sheets-Sheet 4

INVENTOR.
Roland I. Kuffler
BY
Evans + McCoy
ATTORNEYS

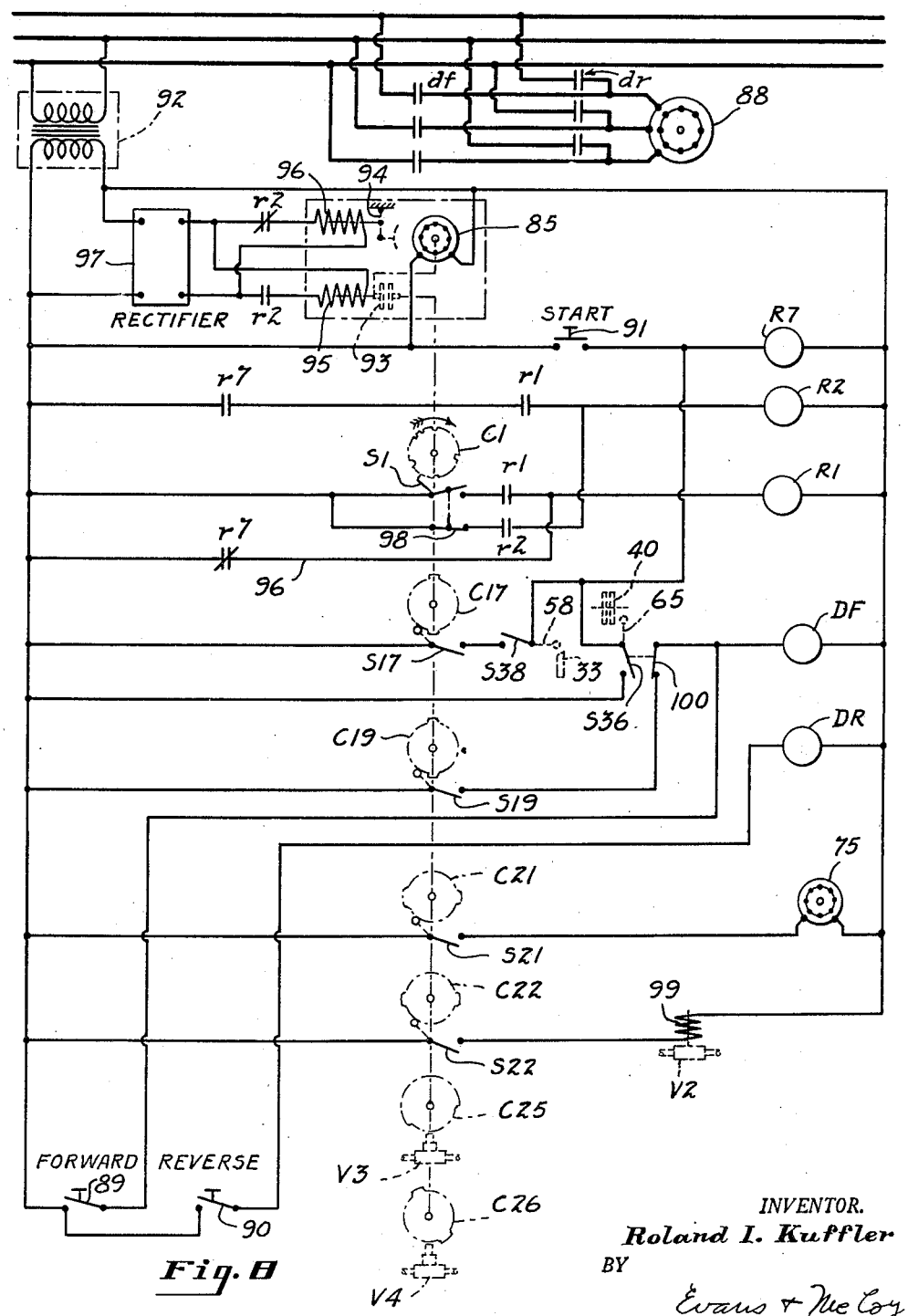

Patented Dec. 6, 1949

2,490,445

UNITED STATES PATENT OFFICE 2,490,445

MECHANISM FOR COMPACTING TIRE CARCASSES ON TIRE BUILDING MACHINES

Roland I. Kuffler, Detroit, Mich., assignor to The General Tire and Rubber Company, Akron, Ohio, a corporation of Ohio Application August 9, 1947, Serial No. 767,762

19 Claims. (Cl. 154—9)

1

This invention relates to tire building machines of the drum type and more particularly to a mechanism for compacting the tire carcass on the drum during the tire building operation.

The invention has for its object to provide means for rapidly compacting the superposed layers of rubber and fabric forming the tire carcass throughout the extent thereof in such manner as to expel any air trapped between the layers of rubber and fabric.

A further object is to provide compacting rollers that are slidable axially on shafts oppositely inclined to the drum axis so that they automatically travel from the center toward the ends of the drum in helical paths when pressed against a tire carcass on the rotating drum.

It is also an object of the invention to provide means for automatically returning said compacting rollers to a central position after each tire compacting operation.

A further object of the invention is to provide means controlled by movements of the compacting rollers for starting and stopping the drum and for retracting the rollers.

An additional object of the invention is to provide in combination with the axially movable compacting rollers, a central tread engaging roller which can be operated independently of the axially movable rollers to apply the tread stock to the tire carcass on the drum.

With the above and other objects in view, the invention may be said to comprise the carcass compacting mechanism as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 8 is a wiring diagram.

Figure 1:
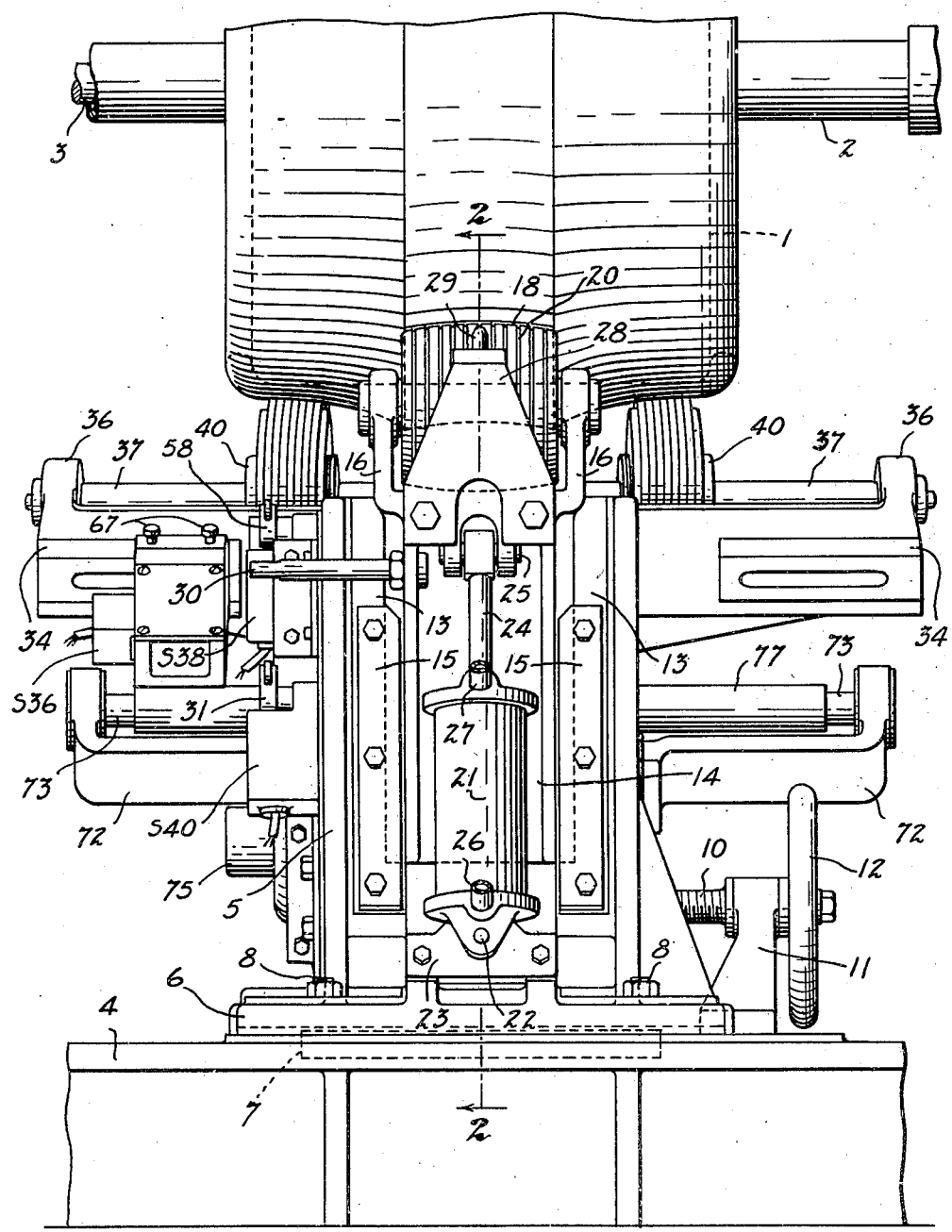
Figure 1 is a fragmentary front elevation showing the lower portion of a tire building drum and the carcass compacting mechanism mounted below the drum.
Figure 2:
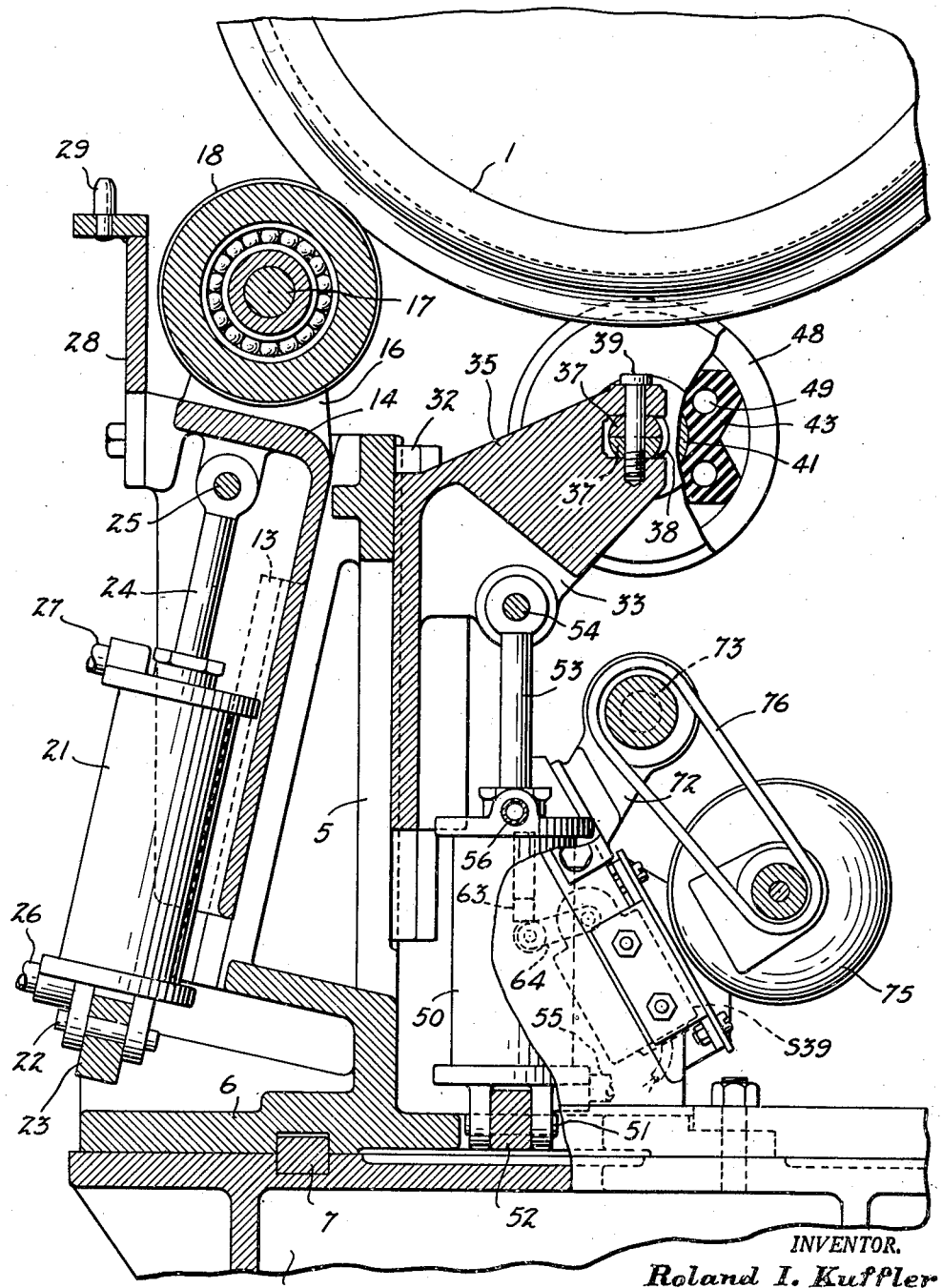
Fig. 2 is a vertical section taken on the line indicated at 2—2 in Fig. 1.
Figure 3:
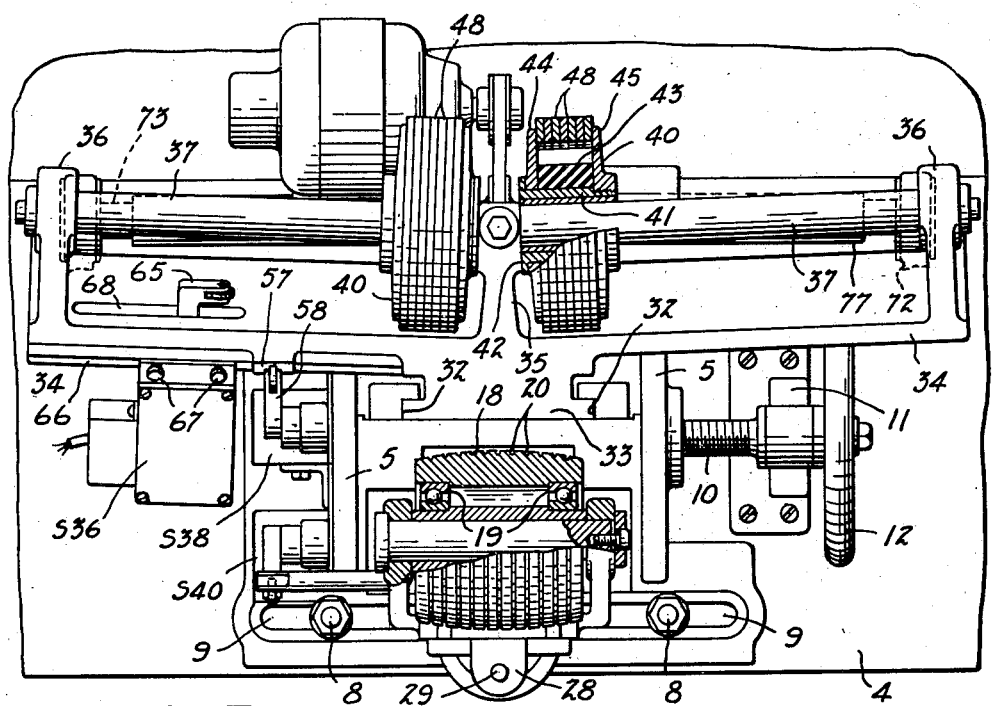
Fig. 3 is a top plan view of the compacting rollers.
Figure 4:
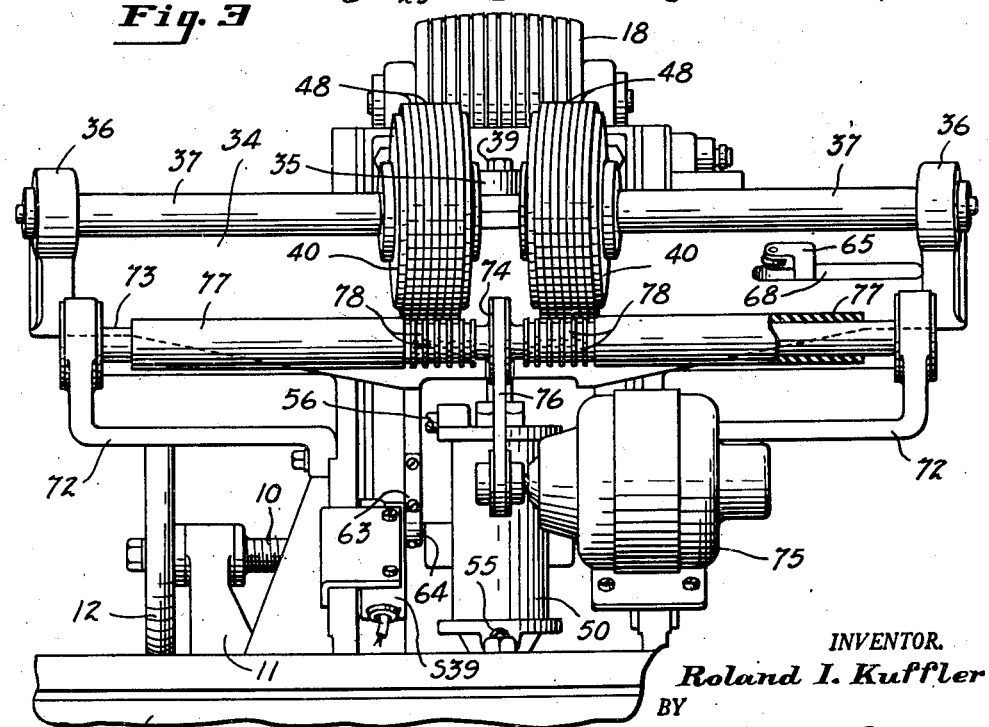
Fig. 4 is a rear elevation of the compacting rollers.

In the accompanying drawings the device of the present invention is shown in connection with a collapsible tire building drum 1 of conventional construction which is mounted in the usual way upon a tubular shaft 2 and an inner shaft 3 mounted within the tubular shaft 2, the drum being expanded and contracted by relative turning movements of the shafts 2 and 3 as is common practice in the art.

The tire building machine, which may be of the type disclosed in the patent to Breth 2,313,035, March 9, 1943, is provided with a base 4 upon which is mounted a standard 5 beneath the drum 1. The standard 5 is mounted for adjustment longitudinally of the base 4 and axially of the drum 1, having a base portion 6 slidably connected to the base 4 by means of a suitable longitudinal key 7 and secured in adjusted position on the base 4 by suitable means such as bolts 8. The bolts 8 engage in longitudinal slots 9 in the base portion 6 of the standard 5 so that when the bolts are loosened the standard may be adjusted longitudinally of the base. The adjustment of the standard 5 on the base 4 is for the purpose of properly positioning the mechanism of the present invention with respect to tire building drums of various sizes and, for quickly and easily shifting the standard, a screw 10 is provided which is carried by a bracket 11 mounted on the base 4 and which is provided with a hand wheel 12. By loosening the bolts 8 and turning the hand wheel 12 the standard 5 can be quickly adjusted to the desired position with respect to the drum 1.

At the front thereof the standard 5 is provided with spaced inclined guide bars 13 in which a carriage 14 is slidably mounted, the carriage being retained on the guide bars 13 by suitable detachable retaining plates 15. At the upper end thereof the carriage 14 is provided with laterally spaced upwardly projecting arms 16 which provide bearings for a horizontal shaft 17 that is disposed parallel to the axis of the drum. The shaft 17 carries a roller 18 which is mounted on ball bearings 19 and which has a convex grooved periphery 20 for engagement with the central portion of a tire carcass on the drum.

The carriage 14 is operated by a fluid pressure cylinder 21 which is connected at its lower end by a pivot 22 to a cross bar 23 attached to the lower end of the standard 5. The cylinder 21 has a piston 24 which is connected at its upper end by a pivot 25 to the carriage 14. The cylinder 21 serves to raise and lower the roller 18 and to press the roller 18 against the drum, fluid under pressure being delivered to the lower end of the cylinder 21 through a pipe 26 and an exhaust pipe 27 being connected to the upper end of the cylinder.

The carriage 14 has a bracket 28 attached thereto which extends upwardly in front of the roller 18 and which carries a vertical pin 29 at its upper end which is adapted to position the delivery end of the tread stock conveyor (not shown) that may be supported on the bracket 28 so that tread stock can be fed from the conveyor between the roller 18 and the drum 1.

A laterally projecting pin 30 is attached to the carriage 14 for engagement with a trip arm 31 of a control switch S40. The switch S40 is a normally open switch which is held in closed position by the carriage 14 when the roller 18 is in its lowermost position, the switch S40 being in a circuit controlling portions of the machine not herein shown which are operated while the compacting rollers are in retracted position.

On the rear side thereof the standard 5 is provided with spaced vertical guide channels 32 in which a carriage 33 is slidably mounted. The carriage 33 has an elongated horizontal top portion 34 which extends past the ends of the drum 1, and which is provided with a central bearing post 35 and bearing posts 36 at the ends thereof, the posts 35 and 36 providing supports for two shafts 37 which are disposed end to end and which are positioned at slight angles of inclination to the axis of the drum, the shafts 37 being oppositely inclined with respect to the drum axis. The center post 35 is provided with a rearwardly opening slot 38 to receive the inner ends of the shafts 37 which are secured in place by means of a bolt 39. A roller 40 is slidably mounted upon each of the shafts 37 and each of these rollers comprises a hub sleeve 41 having a flange 42 at its inner end and carrying a star-shaped rubber body 43 which is clamped against an inner disc 44 that engages the flange 42 by means of an outer disc 45 that is screwed on the sleeve 41. The periphery of each roller 40 is formed by a series of independently movable annular discs 48 that are yieldingly supported upon the points of the star-shaped rubber body 43 and which are held in place by the discs 44 and 45. The discs 48 provide a yielding periphery for the rollers 40 so that these rollers can accommodate themselves to the contour of the material on the drum with which they engage, and, in order to provide a softer cushion for the discs 48 the star-shaped body 44 is preferably provided with a series of apertures 49 that extend axially through the body 44 at the base of each projection.

The rear carriage 33 is operated by means of a vertically disposed fluid pressure cylinder 50 that is connected at its lower end by a pivot 51 to a member 52 that is detachably secured to the base 6 of the standard 5. The cylinder 50 has a piston 53 which is connected at its upper end by a pivot 54 to the carriage 33, the cylinder 50 being provided with pipes 55 and 56 connected to its lower and upper ends through which the flow of fluid under pressure is so controlled that the rollers 40 may be raised and lowered and pressed against the material on the drum 1 by means of the cylinders 50.

The carriage 33 has an inclined shoulder 57 that engages with a trip arm 58 connected to a normally open switch S38 when the rollers 40 are elevated to drum engaging position. The switch S38 controls the operation of the drum 1 and also the application of pressure to the rollers 18 and 40 as will be hereinafter explained and is mounted on an attaching bracket 59 that is mounted for vertical adjustment on the standard 5, being secured to the standard by bolts 60 which pass through vertically disposed slots 61 in the bracket. For additional adjustment of the bracket 59 the standard 5 may be provided with vertically spaced holes 62 to receive the bolts 60. The adjustment of the bracket 59 and switch S38 is for the purpose of accommodating tire building drums of different diameters.

The carriage 33 has a projecting pin 63 that engages when the carriage is in its lowered position with a trip arm 64 of a normally closed switch S39 which provides a safety interlock with portions of the machine not herein shown.

Figure 5:
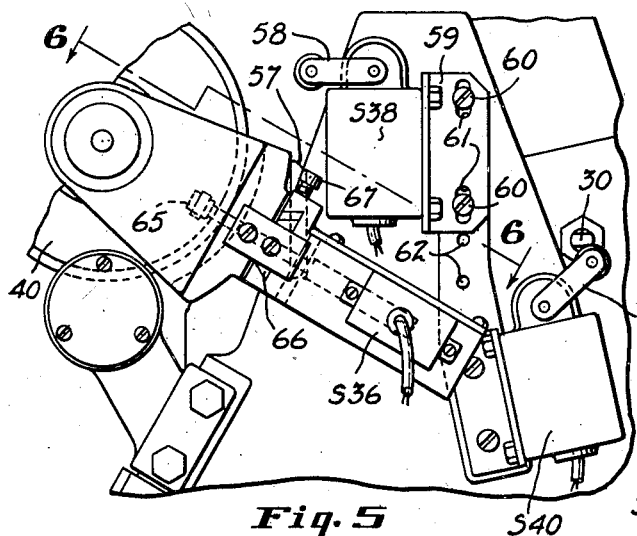
Fig. 5 is a fragmentary side elevation showing the control switches operated by the movable roller supports.
Figure 6:
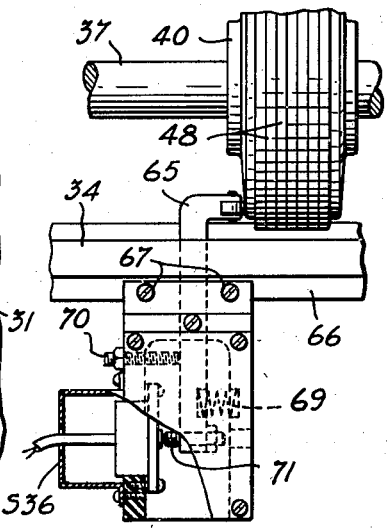
Fig. 6 is a fragmentary plan view of the switch operated by an axially movable roller viewed as indicated at 6—6 in Fig. 5.

One of the rollers 40 engages with a trip arm 65 of a control switch S36 that is mounted upon the top portion 34 of the carriage 33. The switch S36 is adjustably mounted on the portion 34 of the roller supporting carriage so that it can be positioned to be engaged by the roller 40 when the roller 40 reaches an end of the drum, the adjustment of the switch S36 enabling the trip arm 65 to be properly positioned with respect to drums of different lengths. As shown in Figs. 5 and 6, the under side of the carriage 33 is provided with an undercut supporting rib 66 upon which the switch S36 is slidably mounted and to which the switch may be secured in adjusted position by means of bolts 67. The trip arm 65 extends through the laterally extending portion 34 of the carriage which is provided with a longitudinal slot 68 to receive the arm 65. The switch S36 is preferably a micro-switch which is operated by a very slight movement of the arm 65, the arm 65 being backed by a spring 69 which holds the arm against an adjustable stop screw 70 and the arm 65 being provided with a contact engaging screw 71. By adjusting the screws 70 and 71, the necessary movement of the arm 65 may be provided for.

The rollers 40 are initially positioned at the inner ends of the shafts 37 and are elevated into engagement with the tire carcass on the drum 1 while in this position. After the rollers 40 are engaged with the drum 1, the drum is rotated and because of the inclination of the shafts 37 with respect to the drum axis, the rollers 40 will slide outwardly on the shafts 37 while they travel in a helical path on the rotating drum periphery.

The drum 1 is started into operation by the operation of the switch S38 upon engagement of the rollers 40 with the drum, and the drum is stopped by engagement of a roller 40 with the trip arm 65 of the switch S36. The switch S36 also controls the fluid pressure mechanism to lower the rolls and means is provided for automatically returning the rolls 40 to their central position after they are lowered out of drum engaging position.

On the rear portion of the base 6 of the standard, a pair of bearing brackets 72 are mounted and these brackets provide a support for an elongated shaft 73 which has a pulley 74 attached thereto midway between its ends and which is driven by an electric motor 75 through a belt 76 engaging the pulley 74. On opposite sides of the central pulley 74 the shaft 73 has soft rubber sleeves 77 attached thereto which provide yieldable surfaces for engagement with the peripheries of the rollers 40. Rotation of the shaft 73 causes the rollers 40 to slide from the outer ends of the shafts 37 to the inner ends thereof and, in order to reduce friction at the inner ends of the sleeves 77, these sleeves are provided at their inner ends with circumferential grooves 78 which provide a soft tread for engagement with the rollers 40 when at the inner ends of the shaft 37 so that the rollers may slip on the sleeves 77 without excessive friction.

Figure 7:
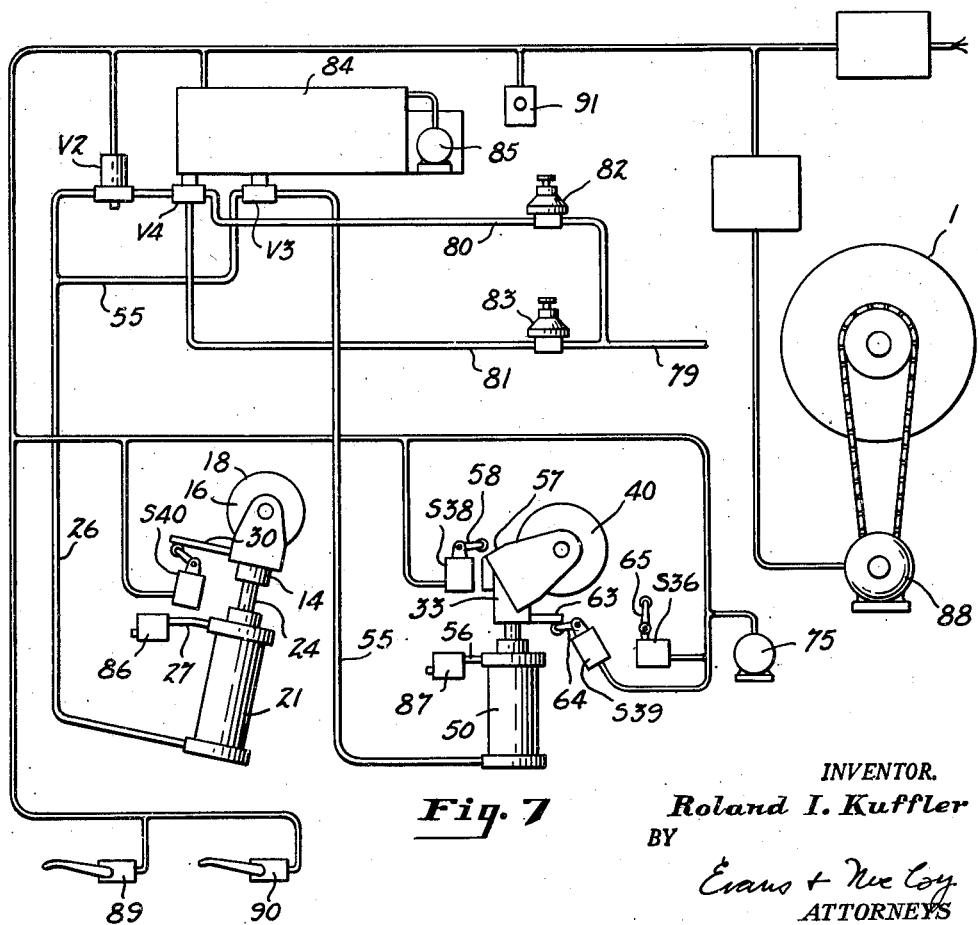
Fig. 7 is a diagrammatic view showing the air pressure lines and the automatic control switches.

As shown in Fig. 7 of the drawings, fluid under pressure, preferably air, for operating the cylinders 21 and 50 is supplied through a pipe line 79 which is connected to branches 80 and 81 provided with pressure control valves 82 and 83, the line 80 having air at a higher pressure than the line 81. The pipe lines 80 and 81 are connected to a control valve V4 which controls flow of air from the lines 80 and 81 to a valve V2 that delivers to the pipe lines 26 and 55 which lead to the lower ends of the cylinders 21 and 50. The valve V2 in one position connects the cylinders to a pressure line and in the other position connects the cylinders to atmosphere to permit lowering of the pistons. The line 55 has a valve V3 therein which opens and closes the line 55 so that pressure may be delivered to the cylinder 21 independently of the cylinder 50. The valve V4 in one position delivers air under high pressure from the line 80 to the valve V2, and in another position delivers air under a lower pressure from the line 81 to the lines 55 and 26. A timer 84 operated by an electric motor 85 directly operates valves V3 and V4 and controls the operation of the valve V2 and other portions of the machine as will be hereinafter explained.

The exhaust pipes 27 and 56 are provided with exhaust retarding valves 86 and 87 which may be adjusted to regulate the speed of movement of the carriages 14 and 33.

The drum 1 is driven by means of a suitable electric motor 88 that is adapted to be controlled by suitable forward and reverse foot switches 89 and 90. Fig. 8 of the drawings illustrates the mechanism which automatically controls certain of the operations performed by the mechanism herein disclosed. The operation of the compression rollers is initiated by means of a suitable starting switch 91 of the push button type which controls operation of the timer 84 which determines the sequence of operations.

Certain of the operations performed by the machine are controlled manually, others by movements of certain of the machine parts, and others by the timer 84 which is intermittently operated in such manner that it is always stopped during portions of the cycle in which the manual and automatic controls are operated. The drum motor 88, the roller return motor 75, the timer 84 and the fluid pressure mechanism are electrically controlled through a circuit which, as shown in Fig. 8, is energized through a suitable transformer 92 which supplies current to the timer operating motor 85. The motor 85 is continuously driven and drives a series of cams which are connected to the motor through a suitable clutch 93. The clutch 93 is normally disengaged and a suitable brake 94 is provided for stopping rotation of the cams when the clutch 93 is disengaged. The clutch 93 and brake 94 are operated by solenoids 95 and 96 which receive current through a rectifier 97.

Relays R1, R2 and R7 control the operation of the timer 84. The relay R1 has two normally open switches r1 which are closed when the relay is energized, one in series with the relay R1 and a timer operated switch S1 and the second in series with the relay R2. The relay R2 includes three switches r2, one normally open and in series with the solenoid 95, one normally closed and in series with the solenoid 96 and the third normally open and in series with the relay R2 and a timer controlled switch 98. The relay R7 includes two switches r7, one normally open and in series with the second switch r1 and the relay R2, and the other normally closed and in series with the relay R1.

Each time during the tire building operation that the carcass compacting mechanism of the present invention is to be operated, the timer is so positioned that relay R1 is energized so that energization of relay R7 by closing the push button switch 91 will also energize the relay R2 which will be held through the timer operated switch 98. Energization of the relay R2 applies the clutch 93 and releases the brake 94, actuating the switches r2 to energize the solenoid 95 and deenergize the solenoid 96.

The drum motor 88 is controlled by the foot switches 89 and 90 through relays DF and DR which include forward and reverse switches df and dr in the motor circuit.

The first operation of the compacting rollers occurs after the inner fabric plies of the tire carcass have been applied to the drum, at which stage of the operation the timer 84 will be stopped with the cam C1 in position to hold the switch S1 open and the switch 98 closed. The relay R1 will be energized through the normally closed switch r7 so that closing the push button 91 will energize relays R7 and R2. Energization of R2 establishes a holding circuit through the switch 98 so that the timer will continue to operate until the relay R2 is again deenergized.

Upon rotation of the timer cams, a timer cam C22 closes a normally open switch S22 to energize a solenoid 99 to shift the valve V2 to a position to admit pressure to both cylinders 21 and 50 to simultaneously raise the rollers 18 and 40, the valve V2 being connected to the low pressure line 80 and the valve V3 being open. The timer cam C17 then closes the normally open switch S17 to condition the circuit of switch S38, and the cam C1 opens the switch 98 to deenergize the relay R2 and stop the timer. The cam C1 closes the switch S1 simultaneously with the opening of the switch 98 to condition the starting circuit for operation upon subsequent reenergization of the relay R7.

When the rear rollers 40 are brought into proximity to the fabric plies previously applied to the drum, the shoulder 57 engages the trip arm 58 and closes the switch S38, which is in series with the previously closed switch S17 and with the relay R7, so that the relay R7 is energized to again energize the relay R2 and again start the timers into operation.

The timer cam C26 then operates the valve V4 to connect the high pressure line 81 to the valve V2 which is being held open by the solenoid 99. This applies high pressure to both the center roller 18 and the laterally movable rollers 40. The cam C19 closes the switch S19 substantially simultaneously with the opening of the valve V4 to energize the relay DF and start the drum driving motor 88 in a forward direction, the switch S19 being in series with the relay DF and a switch 100 that is normally closed and that is movable with the normally open switch S36.

Immediately after the drum is started into rotation the timer cam C17 opens the switch S17, the timer cam C21 closes the normally open switch S21 to start the roller return motor 75, and the timer cam C1 opens the switch 98 to stop the timer.

The rotation of the drum causes the rollers 40 to travel toward the ends of the drum and when the rollers reach the ends of the drum the trip arm 65 is actuated to close the switch S36 and open the switch 100 to stop the drum. Upon operation of the switch S36 the drum 1 is stopped and the relays R7 and R2 are energized to again start the timer, after which the switch S22 is opened to deenergize the solenoid 99 and permit the valve V2 to move to exhaust position, the cam C19 is operated to open the switch S19, and the cam C1 operates to again stop the timer.

The return of the carriages 14 and 33 to lowermost position closes switches S39 and S40 which initiate operations of parts of the machine not shown which again start the timer which opens the switch S21 to stop the roller return motor 75 after the rollers 40 have been returned to the inner ends of the shafts 37.

After the beads have been applied by mechanism not herein shown, the tread stock is applied to the fabric on the drum. At this stage of the operation the timer cams C25 and C26 are positioned to connect the valve V4 to the low pressure line 80 and to hold the valve V3 closed so that upon actuation of the cam C22 low pressure is admitted to the cylinder 21 only to raise the center roll 18 to drum engaging position. The tread stock conveyor may be attached to the bracket 28 and tread stock inserted between the roller 18 and the drum 1, after which the drum may be rotated by means of the foot switch 89 to roll the tread stock onto the carcass fabric previously applied to the drum. The push button 91 is then operated to start the timer and operate the cam 22 to apply low pressure to the roller 18, after which the timer cam C1 stops the timer. The rolling of the tread stock onto the drum is then accomplished by imparting rotation to the drum through the foot switch 89. After the tread stock is applied, the push button is again operated to initiate a cycle of operation similar to that previously described in connection with the compacting of the inner plies of fabric, the rollers 40 being caused to travel in a helical path over the tread stock to the opposite ends of the drum, whereupon the rotation of the drum is stopped, the rollers retracted and the rollers 40 returned to their innermost positions by means of the return rollers 77.

It is to be understood that variations and modifications of the specific devices herein shown and described for purposes of illustration, may be made without departing from the spirit of the invention.

What I claim is:

1. Mechanism for compacting tire casing stock on a tire building drum comprising two supports mounted for movement toward and away from circumferentially spaced portions of the exterior of the drum, a rigid tread engaging pressure applying roller carried by one of said supports and centrally disposed with respect to the drum, a pair of narrower pressure applying rollers carried by the other support and movable thereon axially of the drum from positions in circumferential alinement with opposite side portions of said tread engaging roller to opposite ends of the tire building drum, means for driving the drum, and means for actuating said supports to simultaneously press said rollers against the tire casing stock on the drum.

2. Mechanism for compacting tire casing stock on a tire building drum comprising two supports mounted for movement toward and away from circumferentially spaced portions of the exterior of the drum, a rigid tread engaging pressure applying roller carried by one of said supports and centrally disposed with respect to the drum, a pair of narrower pressure applying rollers carried by the other support and movable thereon axially of the drum from positions in circumferential alinement with opposite side portions of said tread engaging roller to opposite ends of the tire building drum, each of said narrower rollers comprising an elastic yieldable body portion and a stock engaging peripheral portion comprising independently movable rings yieldingly supported on said body portion, means for driving the drum, and means for actuating said supports to simultaneously press said rollers against the tire casing stock on the drum.

3. Mechanism for compacting tire casing stock on a tire building drum comprising two supports mounted for movement toward and away from circumferentially spaced portions of the exterior of the drum, a rigid tread engaging pressure applying roller carried by one of said supports and centrally disposed with respect to the drum, a pair of narrower pressure applying rollers carried by the other support and movable thereon axially of the drum from positions in circumferential alinement with opposite side portions of said tread engaging roller to opposite ends of the tire building drum, and a fluid pressure cylinder for shifting each of said supports to press said rollers against the stock on said drum.

4. Mechanism for compacting tire casing stock on a tire building drum comprising two supports mounted for movement toward and away from circumferentially spaced portions of the exterior of the drum, a rigid tread engaging pressure applying roller carried by one of said supports and centrally disposed with respect to the drum, a pair of narrower pressure applying rollers carried by the other support and movable thereon axially of the drum from positions in circumferential alinement with opposite side portions of said tread engaging roller to opposite ends of the tire building drum, fluid pressure cylinders for shifting said supports to press said rollers against the stock on said drum, and means for supplying pressure to said cylinders including valves controlled by said axially movable rollers for retracting said supports when said rollers reach the ends of the drum.

5. Mechanism for compacting tire casing stock on a tire building drum comprising a support mounted for movement toward and away from the exterior of the drum, a roller mounted on said support for movement axially of the drum, a fluid pressure means for shifting said support and pressing said roller against material on the drum, mechanism for driving said drum, valve means for controlling said fluid pressure means to move the support toward or away from the drum, means including a trip member operated by said support during its movement to drum engaging position for starting said drum, and means including a second trip member operated upon a lateral movement of said roller for stopping said drum and actuating said valve means to retract said support.

6. Mechanism for compacting tire casing stock on a tire building drum comprising a support mounted for movement toward and away from the exterior of the drum, a roller mounted on said support for movement axially of the drum, a fluid pressure means for shifting said support and pressing said roller against material on the drum, a valve mechanism controlling said fluid pressure means to advance or retract said support, a motor for driving said drum, means including a manually operable switch for operating said valve mechanism to advance said support toward the drum, a switch operated by said support for starting the drum motor and a switch operated by said roller upon a predetermined movement axially of the drum for stopping said motor and actuating said valve mechanism to retract said support.

7. Mechanism for compacting tire casing stock on a rotatable tire building drum comprising a movable support, a roller mounted on said support for movement with the support into stock engaging position and on the support in a direction axially of the drum, said roller being mounted on said support to rotate about an axis inclined with respect to the axis of the drum whereby said roller will follow a helical path on the tire casing stock upon rotation of the drum.

8. Mechanism for compacting tire casing stock on a rotatable tire building drum comprising a movable support, a roller mounted on said support for movement with the support into stock engaging position and on the support in a direction axially of the drum, said roller being mounted on said support to rotate about an axis inclined with respect to the axis of the drum whereby said roller will follow a helical path on the tire casing stock upon rotation of the drum, said roller having a yieldable periphery adapted to conform to the tire casing stock with which it engages.

9. Mechanism for compacting tire casing stock on a rotatable tire building drum comprising a movable support, a roller mounted on said support for movement with the support into stock engaging position and on the support in a direction axially of the drum, said roller being mounted on said support to rotate about an axis inclined with respect to the axis of the drum whereby said roller will follow a helical path on the tire casing stock upon rotation of the drum, said roller comprising a hub portion, a periphery composed of a plurality of independently movable rings, and an elastic body interposed between said rings and said hub.

10. Mechanism for compacting tire casing stock on a rotatable tire building drum comprising a support mounted for movement toward or away from the drum periphery, a shaft on said support disposed at a small angle to the axis of the drum, a stock compacting roller slidably mounted on said shaft, said roller having a yieldable periphery adapted to conform to the stock on the drum.

11. Mechanism for compacting tire casing stock on a tire building drum comprising a support movable toward and away from the drum periphery, a rigid tread engaging pressure applying roller carried by said support and centrally disposed with respect to said drum, a second support movable toward and away from the drum periphery, two shafts on said second support having their inner ends substantially midway between the ends of the drum and inclined oppositely with respect to the drum axis, and axially movable pressure applying rollers slidably mounted on said oppositely inclined shafts.

12. Mechanism for compacting tire casing stock on a tire building drum comprising a support movable toward and away from the drum periphery, a rigid tread engaging pressure applying roller carried by said support and centrally disposed with respect to said drum, a second support movable toward and away from the drum periphery, two shafts on said second support having their inner ends substantially midway between the ends of the drum and inclined oppositely with respect to the drum axis, and axially movable pressure applying rollers slidably mounted on said oppositely inclined shafts, said pressure applying rollers having peripheral portions yieldable to conform to the stock on the drum.

13. Mechanism for compacting tire casing stock on a tire building drum comprising a support movable toward and away from the drum periphery, a rigid tread engaging pressure applying roller carried by said support and centrally disposed with respect to said drum, a second support movable toward and away from the drum periphery, two shafts on said second support having their inner ends substantially midway between the ends of the drum and inclined oppositely with respect to the drum axis, and axially movable pressure applying rollers slidably mounted on said oppositely inclined shafts, each of said axially movable rollers comprising a hub portion, a peripheral portion composed of independently movable rings and an elastic body portion interposed between said hub and rings.

14. Mechanism for compacting tire casing stock on a tire building drum comprising a support movable toward and away from the drum periphery, a rigid tread engaging pressure applying roller carried by said support and centrally disposed with respect to said drum, a second support movable toward and away from the drum periphery, two shafts on said second support having their inner ends substantially midway between the ends of the drum and inclined oppositely with respect to the drum axis, axially movable pressure applying rollers slidably mounted on said oppositely inclined shafts, a roller rotatable about an axis parallel with the drum axis and positioned to engage with said axially movable rollers when said rollers are in retracted position, and means for driving said rotatable roller to return said rollers to their innermost positions.

15. Mechanism for compacting tire casing stock on a tire building drum comprising a support movable toward and away from the drum periphery, a rigid tread engaging pressure applying roller carried by said support and centrally disposed with respect to said drum, a second support movable toward and away from the drum periphery, two shafts on said second support having their inner ends substantially midway between the ends of the drum and inclined oppositely with respect to the drum axis, axially movable pressure applying rollers slidably mounted on said oppositely inclined shafts, a roller rotatable about an axis parallel with the drum axis and positioned to engage with said axially movable rollers when said rollers are in retracted position, means for driving said rotatable roller to return said rollers to their innermost positions, a timer controlled by axial movements of said axially movable rollers, and means operated by the timer for starting and stopping said driving means.

16. In a tire building machine, a drum, means for driving the drum, a tread engaging roller positioned midway between the ends of the drum and mounted for movement into and out of engagement with the drum, means for shifting said roller, manually operable means for controlling said roller shifting and drum driving means to apply tread stock to carcass fabric on the drum, a second support movable toward and away from the drum, compacting rollers mounted on said second support for movement axially of the drum, means for moving said second support, a control member operated by said second support and operably connected to the drum driving means to cause the drum to be rotated upon movement of said support toward the drum, and a control member operated by one of said rollers during its axial movement for stopping said drum and retracting said supports.

17. In a tire building machine, a drum, drum driving means, a support mounted for movement toward and away from the drum, axially movable rollers carried by said support and rotating about axes oppositely inclined with respect to the drum axis, whereby said rollers travel in oppositely inclined helical paths around said drum from adjacent the center to the ends thereof, a fluid pressure cylinder for operating said support, a timer, a manually operable control member for starting said timer, means controlled by the timer for admitting fluid to said cylinder to shift said support toward the drum and move said rollers to engaging position and to stop the timer, means controlled by the movement of said support for restarting the timer, means controlled by the timer for rotating said drum and applying high pressure to said cylinder and again stopping the timer, and means controlled by axial movements of said rollers for stopping the drum and exhausting pressure from said cylinders to retract said rollers.

18. In a tire building machine, a drum, drum driving means, a support mounted for movement toward and away from the drum, axially movable rollers carried by said support and rotating about axes oppositely inclined with respect to the drum axis, whereby said rollers travel in oppositely inclined helical paths around said drum from adjacent the center to the ends thereof, a fluid pressure cylinder for operating said support, a timer, a manually operable control member for starting said timer, means controlled by the timer for admitting fluid to said cylinder to shift said support toward the drum and move said rollers to engaging position and to stop the timer, means controlled by the movement of said support for restarting the timer, means controlled by the timer for rotating said drum and applying high pressure to said cylinder and again stopping the timer, means controlled by axial movements of said rollers for stopping the drum and exhausting pressure from said cylinders to retract said rollers, and means for automatically returning said rollers to their central position.

19. In a tire building machine, a drum, an elongated roller of substantially the same length as the drum and rotatable about a fixed axis parallel to the drum axis, a support having two shafts disposed end to end and inclined at opposite inclinations to the drum axis, a roller axially slidable on each of said shafts, means for moving said support from a position in which said rollers engage said elongated roller to a position in which said rollers engage said drum, means for driving said drum, and means for driving said roller.

ROLAND I. KUFFLER.

REFERENCES CITED

The following references are of record in the file of this patent:

UNITED STATES PATENTS

| Number | Name | Date |
| --- | --- | --- |
| 1,834,559 | Waner | Dec. 1, 1931 |
| 2,295,541 | Breth | Sept. 15, 1942 |
| 2,313,035 | Breth | Mar. 9, 1943 |
| 2,342,951 | Lyle | Feb. 29, 1944 |
| 2,358,935 | Leguillon | Sept. 26, 1944 |
| 2,394,464 | McChesney | Feb. 5, 1946 |
| 2,455,038 | Breth | Nov. 30, 1948 |
| 2,464,020 | Breth | Mar. 8, 1949 |